United States Patent
Waldbauer et al.

(10) Patent No.: US 8,046,147 B2
(45) Date of Patent: Oct. 25, 2011

(54) METHOD AND DRIVING DYNAMICS CONTROL SYSTEM FOR STABILIZING A CAR-TRAILER COMBINATION

(75) Inventors: Dirk Waldbauer, Eppstein (DE); Urs Bauer, Ludwigsburg (DE); Lothar Rogowski, Schmitten (DE); Tobias Preusser, Offenbach (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 740 days.

(21) Appl. No.: 12/094,435

(22) PCT Filed: Nov. 16, 2006

(86) PCT No.: PCT/EP2006/068591
§ 371 (c)(1),
(2), (4) Date: Aug. 13, 2008

(87) PCT Pub. No.: WO2007/060135
PCT Pub. Date: May 31, 2007

(65) Prior Publication Data
US 2009/0228182 A1 Sep. 10, 2009

(30) Foreign Application Priority Data

Nov. 22, 2005 (DE) .......................... 10 2005 055 904
Oct. 24, 2006 (DE) .......................... 10 2006 050 716

(51) Int. Cl.
*B60T 8/24* (2006.01)
(52) U.S. Cl. ............. 701/72; 701/70; 303/6.1; 303/123; 303/124; 188/180; 188/181 R
(58) Field of Classification Search .................... 701/70, 701/72; 303/123–124, 6.1; 188/180–181 R
See application file for complete search history.

(56) References Cited

U.S. PATENT DOCUMENTS
4,232,910 A * 11/1980 Snyder .......................... 303/123
(Continued)

FOREIGN PATENT DOCUMENTS
DE 10225120 11/2003
(Continued)

OTHER PUBLICATIONS

Augmentation of Transient Stability Limit of a Power System by Automatic Multiple Application of Dynamic Braking; Joshi, S.S.; Tamaskar, D.G.; Power Apparatus and Systems, IEEE Transactions on; vol. PAS-104, Issue: 11; Digital Object Identifier: 10.1109/TPAS.1985.318941; Publication Year: 1985, pp. 3004-3012.*

(Continued)

*Primary Examiner* — Cuong H Nguyen
(74) *Attorney, Agent, or Firm* — Brinks Hofer Gilson & Lione

(57) ABSTRACT

When swaying motions of a trailer or semi-trailer of a car-trailer combination are encountered, input signals which are taken into consideration to calculate a reference signal frequently include also oscillation components, due to which driving dynamics control for stabilization of the car-trailer combination can become very unreliable. To enhance the reliability of driving dynamics control of this type, a method is disclosed in which an input signal (Y) is sensed that includes signal oscillations which are due to a swaying motion of the trailer or semi-trailer and are superimposed on a base component ($Y_{Basis}$) of the input signal (Y). A reference signal is calculated from the input signal (Y), in which case the calculation is executed in such a way that the reference signal by approximation corresponds to a reference signal which is determined from the base component ($Y_{Basis}$) of the input signal (Y). A correcting variable for influencing the driving behavior of the towing vehicle of the car-trailer combination is then determined depending on a deviation between the reference signal and a detected actual signal. Furthermore, the invention discloses a driving dynamics control system which is appropriate to implement the method.

15 Claims, 5 Drawing Sheets

U.S. PATENT DOCUMENTS

| | | | |
|---|---|---|---|
| 5,141,294 A * | 8/1992 | Van Zanten et al. | 303/182 |
| 6,935,625 B2 * | 8/2005 | Bolt et al. | 267/64.16 |
| 7,192,012 B2 * | 3/2007 | Bolt et al. | 267/64.16 |
| 7,302,332 B2 * | 11/2007 | Nenninger | 701/72 |
| 2005/0040573 A1 * | 2/2005 | Bolt et al. | 267/64.28 |
| 2005/0065694 A1 | 3/2005 | Nenninger | |
| 2005/0248069 A1 * | 11/2005 | Bolt et al. | 267/64.16 |
| 2006/0204347 A1 | 9/2006 | Waldbauer et al. | |
| 2006/0244579 A1 | 11/2006 | Raab | |

FOREIGN PATENT DOCUMENTS

| | | | |
|---|---|---|---|
| DE | 10342865 A1 * | 4/2005 | |
| EP | 0358973 | 3/1990 | |
| EP | 349544 B * | 6/1991 | |
| JP | 2008179259 A * | 8/2008 | |
| WO | WO 8807466 A * | 10/1988 | |

OTHER PUBLICATIONS

A Study on Automatic Driving Technique of Tractor-Semitrailer; Li Xian-sheng; Zhang Jian-guo; Measuring Technology and Mechatronics Automation (ICMTMA), 2010 International Conference on; vol. 1; Digital Object Identifier: 10.1109/ICMTMA.2010. 317; Publication Year: 2010 , pp. 365-368.*

Ryu, J.-C., Agrawal, S. K., and Franch, J., "Motion Planning and Control of a Tractor With a Steerable Trailer Using Differential Flatness," Proceedings of the International Design Engineering Technical Conference (IDETC), Paper No. DETC2007-35288, 2007.*

Hyun, D. and Langari, R. "Development of a parsimonious dynamic model of tractor-semitrailers", Journal of Heavy Vehicle Systems, vol. 9, No. 2, pp. 298-318,2002.*

Chen, C. and Tomizuka, M., "Steering and independent braking control for tractor-semitrailer vehicles in automated highway systems," Proc. of the 34th Conference on Decision & Control, New Orleans, pp. 1561-1566, 1995.*

Manuel J. F.-G., Ricardo H.-J. and Miguel M.-M.,"Experimental Study of the Maneuverability of a Testing Trailer with a Steering Axle at Low Speed Maneuvers",SAE 2008-01-2705.*

Influence of Communication Delay on the Performance of Fuzzy Logic-Controlled Braking Resistor Against Transient Stability Ali, M.H.; Murata, T.; Tamura, J.; Control Systems Technology, IEEE Transactions on; vol. 16 , Issue: 6; Digital Object Identifier: 10.1109/ TCST.2008.919443; Publication Year: 2008 , pp. 1232-1241.*

Stabilization of Automotive Vehicles Using Active Steering and Adaptive Brake Control Allocation; Tjonnas, J.; Johansen, T.A.; Control Systems Technology, IEEE Transactions on; vol. 18 , Issue: 3; Digital Object Identifier: 10.1109/TCST.2009.2023981; Publication Year: 2010 , pp. 545-558.*

* cited by examiner

METHOD AND DRIVING DYNAMICS CONTROL SYSTEM FOR STABILIZING A CAR-TRAILER COMBINATION

BACKGROUND OF THE INVENTION

The present invention relates to a method for stabilizing a car-trailer combination consisting of a towing vehicle and a trailer or semi-trailer. The invention further relates to a driving dynamics control system for stabilizing a car-trailer combination consisting of a towing vehicle and a trailer or semi-trailer, which is appropriate for implementing the method.

Car-trailer combinations, which consist of a towing vehicle and a trailer or semi-trailer, exhibit an unstable driving performance starting from a defined limit speed. Above the limit speed, swaying motions of the trailer or semi-trailer occur, with their amplitudes rising. Especially when driving on the highway car-trailer combinations frequently reach the limit speed so that swaying motions of the trailer are provoked which partly cause serious accidents. The reason is that operators of average skills are generally unable to stabilize a swaying car-trailer combination to a sufficient degree because steering movements which are performed for stabilization, due to the response time, are not in the necessary phase relation to the swaying motions so that these are even amplified under certain circumstances.

To stabilize car-trailer combinations, driving dynamics control systems are known in the art which detect yaw oscillations of the car-trailer combination in a robust fashion and stabilize the car-trailer combinations by braking interventions independently of the driver. As this occurs, the speed of the car-trailer combination is reduced below the limit speed. It is furthermore known to use automatic steering interventions, in which a steering angle at the steerable wheels of the towing vehicle is set independently of the driver by way of a steering actuator, or braking interventions in order to produce a yaw torque which dampens the yaw oscillations. The yaw torque is determined in particular from a deviation between a detected actual yaw rate and a reference yaw rate, which usually is calculated using a vehicle model especially based on a steering angle signal that is representative of the direction requested by the driver.

However, the problem is encountered in this respect that the steering angle signal which is included in the calculation of the reference yaw rate can exhibit signal oscillations which are due to the swaying motions of the trailer. The signal oscillations can be provoked especially by steering movements, which are performed by the driver or the steering actuator for compensation of yaw oscillations of the car-trailer combination. This can impair the driving dynamics control and, more particularly, cause erroneous interventions of the control system.

DESCRIPTION OF THE INVENTION

In view of the above, an object of the invention is to provide a more reliable driving dynamics control for stabilizing car-trailer combinations comprising a towing vehicle and a trailer or semi-trailer.

SUMMARY OF THE INVENTION

According to the invention, a method of the type initially referred to is implemented with the following steps:
detecting an input signal with signal oscillations which are due to a swaying motion of the trailer or semi-trailer, in which case the signal oscillations are superimposed on a base component of the input signal,
calculating a reference signal from the input signal, in which case the calculation is executed in such a way that the reference signal by approximation corresponds to a reference signal which is determined from the base component of the input signal,
determining a correcting variable depending on a deviation between the reference signal and a detected actual signal, and
influencing the vehicle condition of the towing vehicle according to the determined correcting variable.

Furthermore, a driving dynamics control system is provided for stabilizing a car-trailer combination consisting of a towing vehicle and a trailer or a semi-trailer. The driving dynamics control system comprises:
a sensor used to sense an input signal which includes signal oscillations being due to a swaying motion of the trailer or semi-trailer, in which case the signal oscillations are superimposed on a base component of the input signal,
a calculating device which is designed to calculate a reference signal from the input signal, in which case the calculation is executed in such a way that the reference signal by approximation corresponds to a reference signal which is determined from the base component of the input signal,
a controlling device in which a correcting variable can be determined depending on a deviation between the reference signal and a detected actual signal, and
an actuator which can influence the vehicle condition of the towing vehicle according to the determined correcting variable.

Advantageously, the invention is based on the fact that the input signal includes an oscillation component which is due to swaying motions of the trailer or semi-trailer and, furthermore, contains a base component which is linked to the proper course of the vehicle. Based on this input signal, the calculation of the reference signal is performed in such a manner that it corresponds by approximation to a reference signal determined from the base component of the input signal. Thereby a reference signal is obtained which mirrors the desired proper course of the vehicle. A driving dynamics control operation can then be carried out in a reliable fashion based on this reference signal.

Signal oscillations in the context of the invention imply oscillation components of the input signal, which are directly or indirectly due to the swaying motions of the trailer or semi-trailer. For example, the swaying motions of the trailer take a direct influence on the yaw rate of the vehicle as a possible input signal. An indirect influencing action is taken, for example, with respect to the steering angle when steering movements are performed in order to compensate the yaw oscillations of the car-trailer combination. The base component on which the oscillations are superimposed is the remaining component of the input signal which mirrors in particular the course of the vehicle or the course desired by the driver, respectively. This component can also adopt zero value when the vehicle is driving straight ahead, for example.

In an embodiment of the method and the driving dynamics control system, it is arranged that an intermediate signal is calculated from the input signal in a correction step, which intermediate signal corresponds by approximation to the base component of the input signal, and that the intermediate signal is taken into account in order to determine the reference signal.

Since the intermediate signal, at least by approximation, corresponds to the base component of the input signal, the reference signal in this embodiment can be determined from a modified input signal. That means, the calculation of the reference signals, compared to the conventional calculation, requires only one additional signal processing step in which the intermediate signal is determined.

An embodiment of the method and the driving dynamics control system provides that the reference signal is a reference yaw rate signal and the actual signal is an actual yaw rate signal sensed by means of a yaw rate sensor.

Favorably, a reference yaw rate is calculated in this embodiment, on the basis of which the car-trailer combination is stabilized.

Besides, an embodiment of the method and the driving dynamics control system includes that the reference signal is calculated depending on the intermediate signal using a vehicle model.

An embodiment of the method and the driving dynamics control systems provides that the input signal is a steering angle signal sensed by means of a steering angle sensor.

Thus, it is possible in the invention to determine a reference yaw rate signal in a usual way from the steering angle signal, which includes an oscillation component that is due in particular to steering movements for the compensation of yaw oscillations of the car-trailer combination. In this action, the steering angle signal is rid of this oscillation component.

Another embodiment of the method and the driving dynamics control system is characterized in that the input signal corresponds to the actual signal and the intermediate signal corresponds to the reference signal.

More particularly, the reference yaw rate signal in this embodiment can be determined directly from the sensed yaw rate signal in the correction step mentioned hereinabove, without a model-based calculation being carried out.

The embodiment includes the special advantage that the deviation between the reference signal and the actual signal corresponds exactly to the oscillation component of the input signal which is due to the swaying motions of the trailer or semi-trailer.

An improvement of the method and the driving dynamics control system is characterized in that, in the correction step, average values of successive extreme values of the input signal are produced and that the intermediate signal is determined according to the average values.

The base component of the reference signal which is due to the course requested is favorably determined in this improvement based on average values of successive extrema of the input signal. The signal oscillations are removed by calculation from the input signal using this averaging operation.

However, generally there is a certain interval between the occurrence of two successive extrema of the input signal.

Therefore, an embodiment of the method and the driving dynamics control system provides that the intermediate signal or the reference signal is determined at a point of time by way of an extrapolation process from average values produced before the point of time.

This allows realistically determining the intermediate signal that is rid of signal oscillations also between the occurrence of two extrema of the input signal. More particularly, signal variations which take place between the occurrence of two extrema can be considered this way.

Furthermore, an embodiment of the method and the driving dynamics control system includes that the average values in the extrapolation process are furnished with a weighting factor which is lower for average values produced in the former past than for average values produced in the recent past.

This allows further improving the quality of extrapolation.

Furthermore, an improvement of the method and the driving dynamics control system is characterized in that the intermediate signal is determined from the average values by means of a model-based filter.

Owing to its comprehensive property of parameterization, the model-based filter generally allows an especially flexible adjustment to which extent the intermediate signal shall be approximated to the input signal.

An embodiment of the method and the device is characterized in that the input signal is considered as an actuating variable and the intermediate signal is considered as a model output quantity within the model on which the filter is based.

The model output quantity in this context implies the output quantity of the model on which the filter is based, which typically concerns a condition variable of the model-based system. In this case, the term 'actuating variable' in particular refers to the variable representing the control input of the model.

An embodiment of the method and the device provides that the filter is a Kalman filter.

Furthermore, it is arranged for in an embodiment of the method and the device that the correcting variable is a steering torque applied to a steering handle that can be manipulated by the driver in order to influence the driving condition of the vehicle. Another embodiment of the method and the device provides that the correcting variable is an additional steering angle which allows controlling a steering system (superposition steering system, electrohydraulic or electric steering system) in order to influence the driving condition of the vehicle.

The invention permits a stable control especially in this embodiment. This is because the problem can be encountered herein that due to the steering torque that is applied to the steering handle, a steering angle is set for the compensation of the oscillations of the car-trailer combination, which is detected and taken into account for the production of the reference yaw rate. As a result, the correcting variable itself which is determined in the controlling device would be used to determine the reference variable, which generally leads to an unstable control. However, since the reference yaw rate in the invention is calculated in such a manner that it does not contain the oscillation component which develops due to the oscillation component of the steering angle that compensates the oscillations of the car-trailer oscillations, such instabilities will not be encountered in the invention.

In addition, a computer program product is made available which defines an algorithm comprising a method of the type illustrated hereinabove.

These and other advantages, special characteristics and suitable embodiments of the invention are also clearly described by way of the embodiments and with respect to the embodiments with reference to the Figures in the following.

DETAILED DESCRIPTION OF THE DRAWINGS

Figure 1:
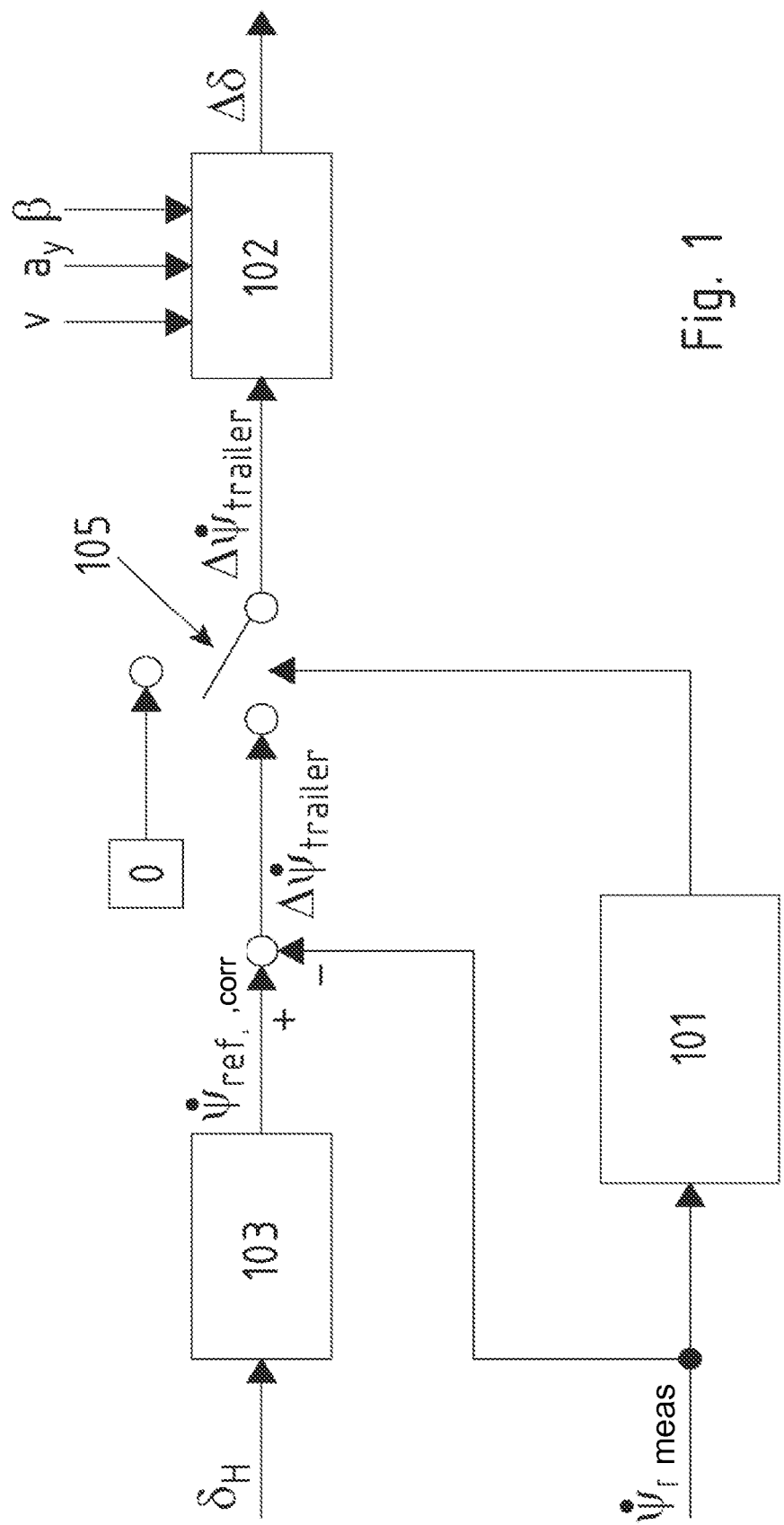
FIG. 1 is a block diagram of a control system in a first embodiment.
Figure 5:
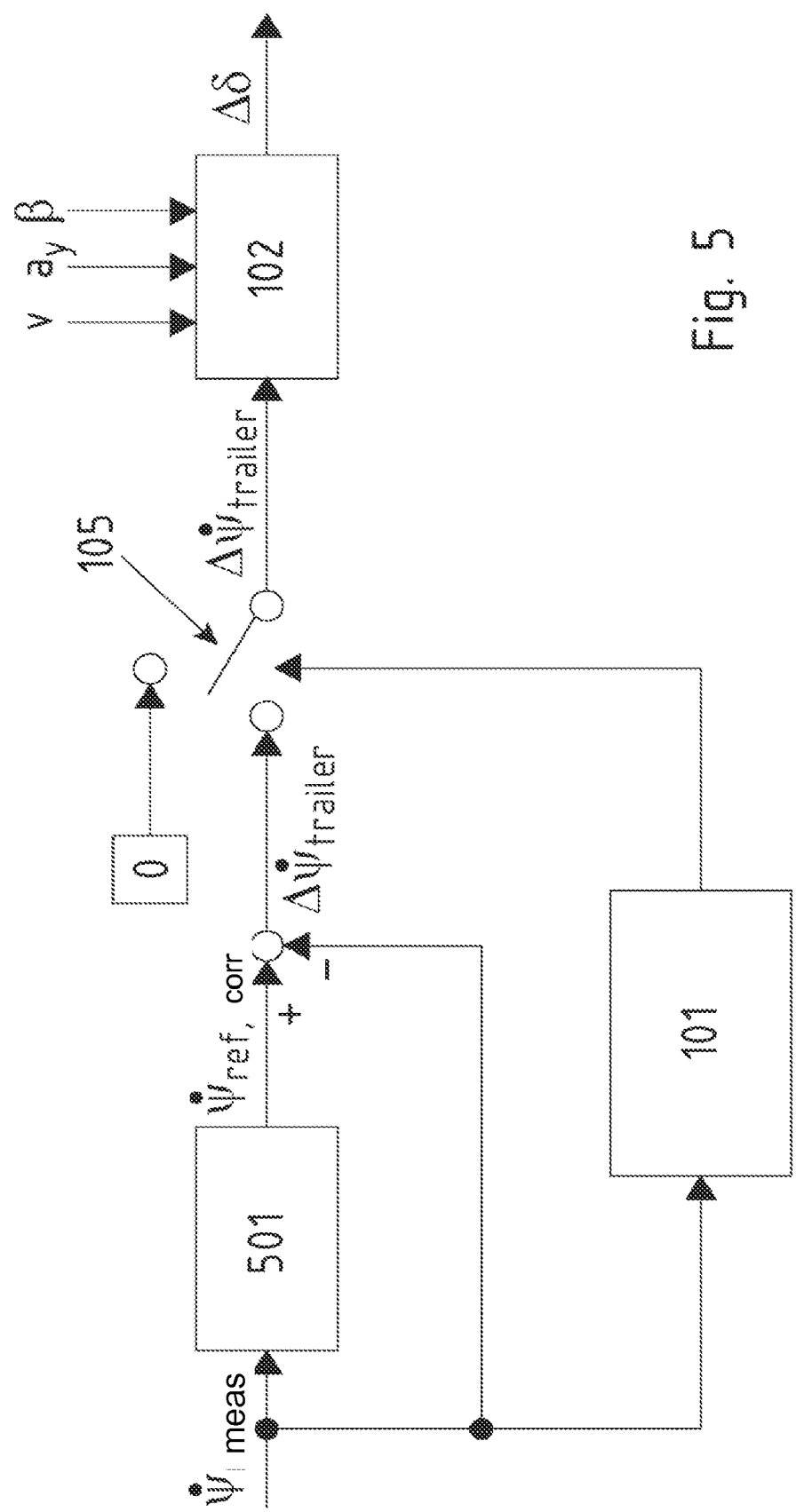
FIG. 5 is a block diagram of a control system in a second embodiment.

FIG. 1 shows a schematic block diagram of a first embodiment of a control system to stabilize a car-trailer combination. The car-trailer combination comprises, for example, a two-axle four-wheel towing vehicle with steerable front wheels and a trailer coupled to the towing vehicle. The control system comprises an activating device 101 in which swaying motions of the trailer are detected in a way which is principally known to the expert in the art. The swaying motions of the trailer cause harmonious signal oscillations of the actual yaw rate signal $\dot{\psi}_{meas}$ and a lateral acceleration signal. The frequencies of these signal oscillations typically range between 0.5 hertz and 1.5 hertz approximately. Therefore, harmonious oscillations with frequencies of this type can be identified in the sensed signals in order to detect swaying motions, in which case FIG. 5 depicts by way of example only the evaluation of the actual yaw rate $\dot{\psi}_{meas}$. This signal is sensed by means of a yaw rate sensor not shown in the Figure. The lateral acceleration signal, which can be taken into consideration additionally or alternatively, can be sensed by means of a lateral acceleration sensor which is not shown in the Figure either.

When a swaying motion of the trailer is detected in the activating device 101, a controlling device 102 is activated in which a correcting variable is calculated from a deviation $\Delta\dot{\psi}_{Trailer}$ between a reference yaw rate signal $\dot{\psi}_{ref,corr}$ and the actual yaw rate signal $\dot{\psi}_{meas}$, according to which correcting variable the driving performance of the towing vehicle or the car-trailer combination can be influenced by means of an actuator. The activation mechanism is illustrated schematically in FIG. 1 by way of switch 105. The controlling device 102 in the embodiment shown contains an adaptive proportional-differential controller (PD-controller), whose controller parameters can be adapted in particular to the vehicle speed v, which can be determined from the signals of wheel rotational speed sensors, for example, to the lateral acceleration $a_y$ sensed by means of the lateral acceleration sensor, as well as to an estimate rate for the sideslip angle $\beta$ of the towing vehicle which is established by way of measured variables. In the embodiment of the control system illustrated by way of example, the controller output quantity is an additional steering angle $\Delta\delta$, the setting of which at the steerable wheels of the towing vehicle leads to stabilization of the car-trailer combination and the development of a yaw torque which compensates the yaw oscillations, respectively.

Figure 2:
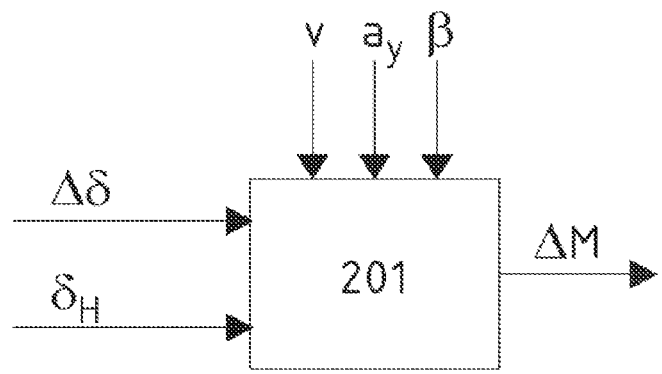
FIG. 2 is a block diagram of a calculating unit of the control system in a first embodiment.

The additional steering angle $\Delta\delta$ is set in an embodiment using a steering actuator at the steerable wheels of the vehicle. As this occurs, an additional steering angle is superposed on the steering angle set by the driver so that a steering angle is achieved at the steerable wheels which results in the sum of the driver steering angle and the additional steering angle. For example, a so-called superposition steering system can be used as an actuator in this embodiment. In another embodiment of the invention, an actuator is used to introduce a steering torque into the steering line of the towing vehicle, the said steering torque being applied in particular to the steering handle operated by the driver. This steering torque provides the driver of the towing vehicle with a recommendation how to execute stabilizing steering movements. As is illustrated in FIG. 2, the steering torque $\Delta M$ is determined in a torque calculating device 201 based on the additional steering angle $\Delta\delta$. Apart from the additional steering angle $\Delta\delta$, preferably, the steering angle $\delta_H$ that is set at the steerable wheels is also taken into account when establishing the steering torque $\Delta M$. Furthermore, the determination is executed depending on the vehicle speed v, the lateral acceleration $a_y$, and the sideslip angle $\beta$. The inclusion of the sideslip angle is possible, however, not necessary. The actuator for the introduction of the steering torque $\Delta M$ into the steering line is configured as an electronic servo steering system, for example, which includes an interface for the external actuation by means of the controlling device 102.

Figure 4:
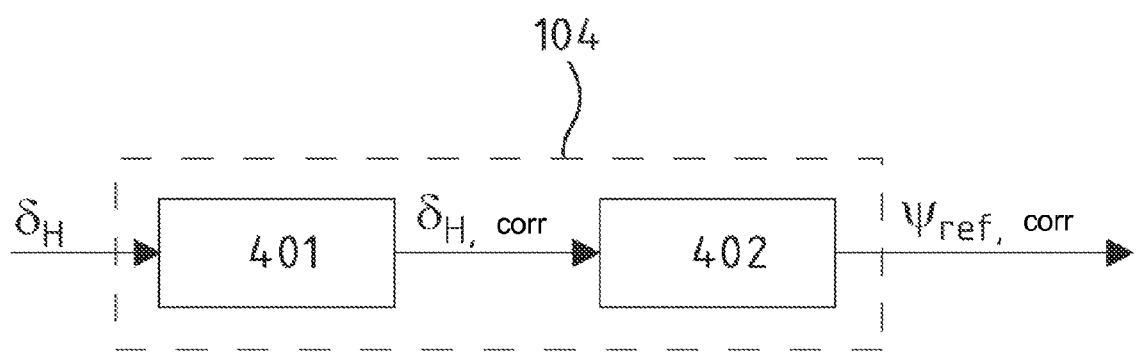
FIG. 4 is a block diagram of the calculating unit of the control system in a second embodiment.

In still further embodiments, it is also possible to perform braking interventions to stabilize the car-trailer combination using a brake actuator. In this case, the controller output quantity preferably is a yaw torque as shown in FIG. 4, which is taken into consideration for the calculation of wheel-individual brake forces which are then set by means of the brake actuator.

The reference yaw rate $\dot{\psi}_{ref,corr}$ in the embodiment of the control system illustrated in FIG. 1 is determined within the calculating device 104 based on a vehicle model especially from the steering angle signal $\delta_H$. The latter signal indicates the steering angle which has been set by the driver at the steerable wheels of the towing vehicle or at a steering wheel and is sensed by means of a steering angle sensor. Besides, additional input quantities such as the vehicle speed v can be taken into consideration for the calculation of the reference yaw rate $\dot{\psi}_{ref,corr}$. A model such as a linear single-track model of the towing vehicle, which is principally known to the expert in the art, can be used as a vehicle model.

Oscillations of the car-trailer combination which result from swaying motions of the trailer in general are also reflected in the steering angle signal $\delta_H$. This is especially the case when a steering torque is applied to the steering line of the towing vehicle in order to stabilize the car-trailer combination. To dampen the oscillations, this steering torque also has a periodically oscillating course which is essentially in antiphase to the yaw oscillations of the car-trailer combination. The phase relation of the steering torque trailer oscillation depends on the actuator (inertias in the steering system). The phase variation in relation to the resulting steering angle at the wheel is important, which is indeed by approximation in antiphase to the oscillation. Since steering movements are performed on account of the steering torque, the steering angle signal $\delta_H$ also includes oscillations. If, based on this steering angle signal, a reference yaw rate signal was calculated using a vehicle model, these oscillations would also be found in the reference yaw rate signal, which could thus not be employed as a reference signal for a control or due to the feedback of the correcting variable to the reference signal would cause an unstable control, respectively.

Figure 3:
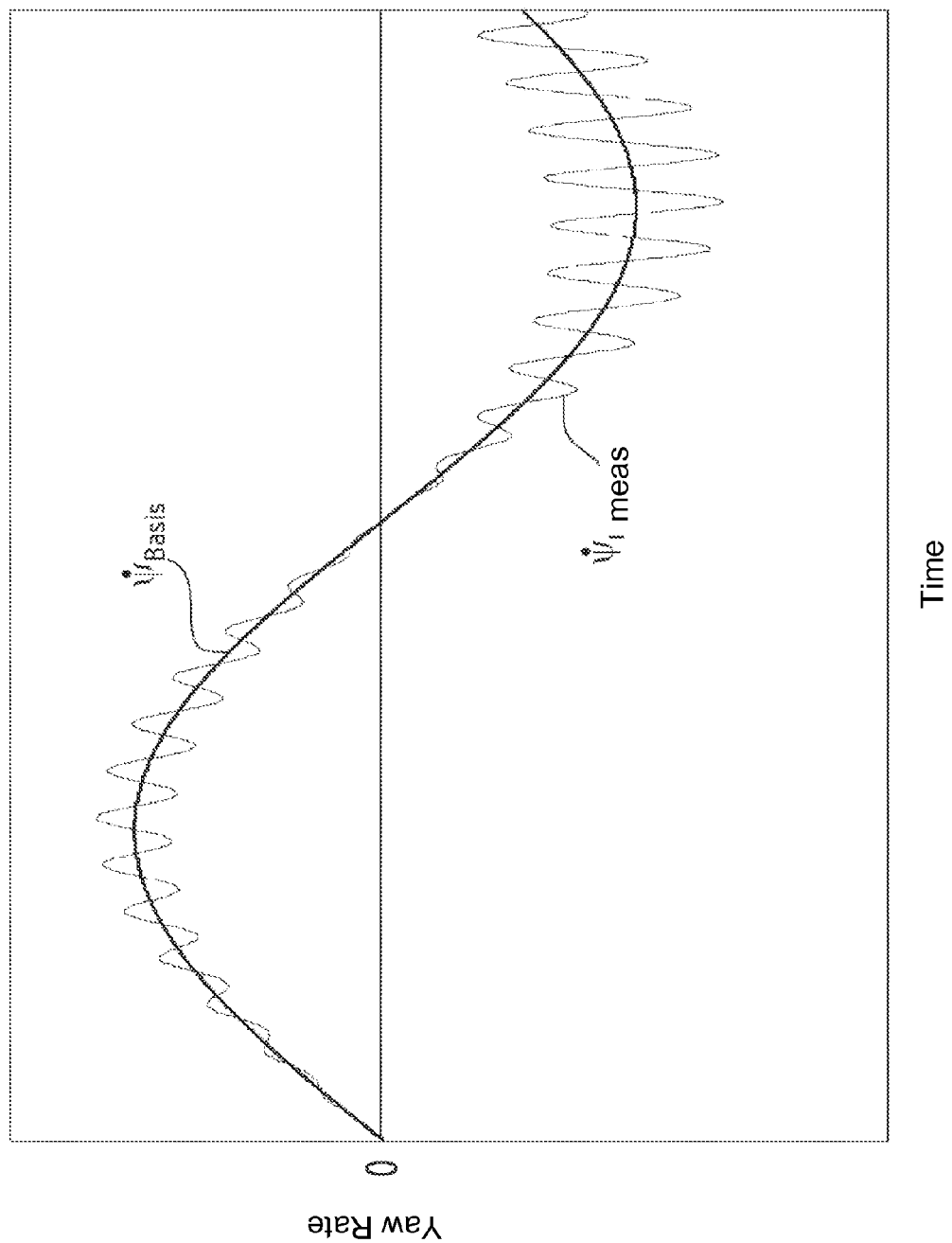
FIG. 3 is a diagram with a representation of the variation of the yaw rate during a driving maneuver of a towing vehicle with and without a swaying trailer.

The invention is based on the fact that the vehicle quantities influenced by the oscillations of the car-trailer combination include an oscillation component which is due to oscillations of the car-trailer combination. This oscillation component is superposed on a base component which is influenced merely by the actual course of the vehicle or by the course of the vehicle desired by the driver, respectively. For illustration purposes, FIG. 3 exemplarily depicts the time variation of the measured yaw rate $\dot{\psi}_{meas}$ of a towing vehicle in which the oscillations produced by the oscillations of the car-trailer combination can be seen. The actual yaw rate signal $\dot{\psi}_{meas}$ is achieved therein by a superposition between an oscillation component determined by the oscillations of the car-trailer combination and a base component mirroring the course of the vehicle. This component is illustrated in FIG. 3 by way of curve $\dot{\psi}_{Basis}$. In particular in the embodiment of the invention in which a steering torque is introduced into the steering line, the measured steering angle signal principally has a similar oscillating variation as the actual yaw rate signal $\dot{\psi}_{meas}$, in which an oscillation component is superposed on a base component which corresponds to the course requested by the driver.

Therefore, a reference yaw rate signal $\dot{\psi}_{ref,corr}$ is determined in the calculating device 104 which corresponds to the corresponding base component of a reference yaw rate. FIG. 4 illustrates an embodiment of the calculating device 104 by way of a schematic block diagram. The steering angle signal $\delta_H$ in this embodiment is sent to a block 401. Based on the steering angle signal, an intermediate signal $\delta_{H,corr}$ is calculated in block 401 in a manner still to be described, which does not include the oscillation components of the steering angle signal $\delta_H$ and, by approximation, corresponds to the base component of the steering angle signal $\delta_H$ being representative of the direction requested by the driver. The intermediate signal $\delta_{H,corr}$ is then taken into account in block 402 for the calculation of the reference yaw rate signal $\dot{\psi}_{ref,corr}$ using the vehicle model.

In FIG. 5, another embodiment of the control system is shown in which the reference yaw rate signal $\dot{\psi}_{ref,corr}$ is calculated in a calculating device 501 from the measured yaw rate signal $\dot{\psi}_{meas}$. In a manner which is still to be described, the reference yaw rate signal $\dot{\psi}_{ref,corr}$ is calculated in the calculating device 501 from the actual yaw rate signal $\dot{\psi}_{meas}$ including oscillation components, which does not contain the oscillation components and, thus, corresponds to the base component of the actual yaw rate signal $\dot{\psi}_{meas}$. In other respects, the control system corresponds to the system illustrated in FIG. 1. The reference yaw rate signal in this embodiment thus corresponds to the base component of the actual yaw rate signal $\dot{\psi}_{meas}$. It is assumed then that the car-trailer combination is stably moving except for the appearing yaw oscillations. The advantage of this embodiment lies in that the deviation $\Delta\dot{\psi}_{trailer}$ exactly reflects the yaw oscillations of the car-trailer combination.

Figure 6:
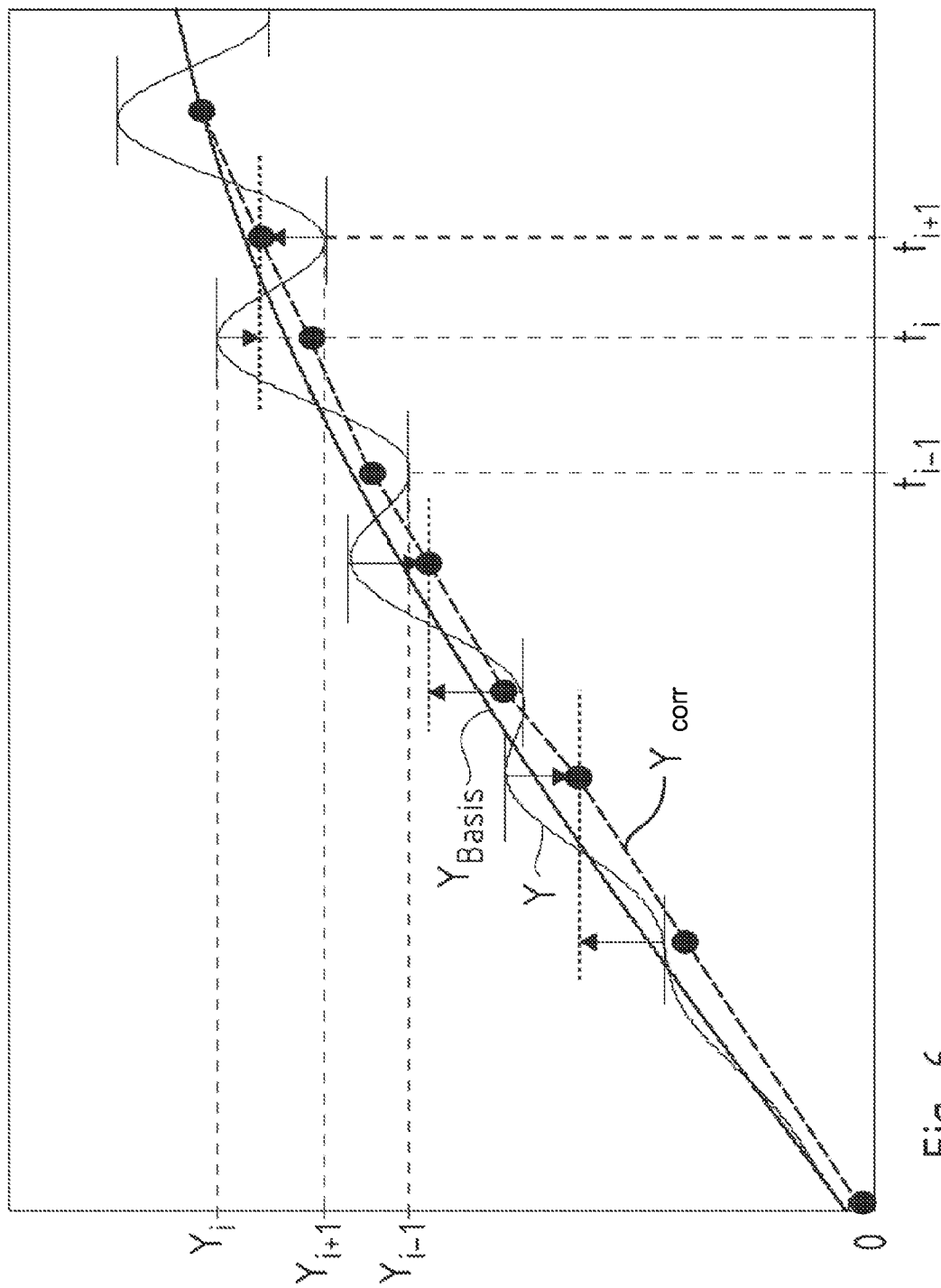
FIG. 6 is a diagram illustrating the determination of a signal that is rid of oscillations from an oscillating signal.

Based on FIG. 6, a preferred calculation process is described hereinbelow, which allows removing superposing signal oscillations from the steering angle signal $\delta_H$ or from the actual yaw rate signal $\dot{\psi}_{meas}$ and estimating the corresponding base signal. In FIG. 5, a first signal Y including an oscillation component is shown by way of example, which signal can be, for example, the steering angle signal $\delta_H$ or the actual yaw rate—signal $\dot{\psi}_{meas}$. The oscillations of the signal Y are superposed on a base signal $Y_{Basis}$, which is also illustrated in FIG. 6. For the calculation by approximation of the base signal $Y_{Basis}$ using the corrected signal $Y_{corr}$, respectively successive local extrema of the signal are sensed, in which case in the Figure especially the local minimum value $Y_{i-1}$ is plotted by way of example at time $t_{i-1}$ and the following local maximum value $Y_i$ is plotted at time $t_i$. An average value is then produced for a pair with two successive local extreme values of the signal, in which case especially the average value $$\overline{Y}_{i-1,i} = \frac{Y_{i-1} + Y_i}{2} \quad (1)$$

of the local minimum value $Y_{i-1}$ and the local maximum value $Y_i$ is plotted in the Figure by way of example. The average value represents a value of the corrected signal $Y_{corr}$ in this case. In the exemplary embodiment shown, the average value is set as the value of the signals $Y_{corr}$ at the time of the appearance of the second local extremum of a pair of successive extrema so that the signal value $\overline{Y}_{i-1,i}$ is set in particular at time $t_i$ for the signal $Y_{corr}$. It is principally possible, however, to set the average value as the signal value at any time desired between the appearance of two successive local extrema.

The second local extremum of a pair furthermore represents the first local extremum of a following pair of local extreme values, from which again a signal value is determined in the fashion described hereinabove for the signal $Y_{corr}$ to be calculated. That means, for example, that the local maximum value $Y_i$ at time $t_i$ produces the first local extremum of a pair which comprises the minimum value $Y_{i+1}$ at time $t_{i+1}$ in addition.

The average value $$\overline{Y}_{i,i+1} = \frac{Y_i + Y_{i+1}}{2} \quad (2)$$

thus represents another signal value of the corrected signal $Y_{corr}$, which is set for the time $t_{i+1}$ in the illustrated embodiment. Thus, reference points $$\{\ldots, (t_i, \overline{Y}_{i-1,i}), (t_{i+1}, \overline{Y}_{i,i+1}), \ldots\}$$

are consecutively calculated for the signal $Y_{corr}$ from pairs of successive extrema of the signal Y.

After the calculation of a reference point and until the calculation of the next reference point, the signal $Y_{corr}$ is extrapolated preferably by way of the reference points determined already before. In this case, parameters of a function such as a polynomial of a defined order are determined by way of the previously established reference points. The signal value at a time after the calculation of the preceding reference point is then achieved as a function value of the determined function. In addition, a weighting factor is preferably employed in the determination of the parameters, attributing a lower weight to the reference points of the former past than to those in the recent past. A weighting factor of this type, which frequently is referred to as a 'forgetting factor', renders it possible to take reference points in the former past into account in the extrapolation to a less decisive extent. At the same time, the original signal Y is taken into consideration to a greater extent.

In another embodiment which is especially suitable for the direct determination of the reference yaw rate signal $\dot{\psi}_{ref,corr}$ from the actual yaw rate signal $\dot{\psi}_{meas}$, the corrected signal is calculated by means of a Kalman filter based on a single-track model of the vehicle which is characterized by a $PDT_2$- or $PT_2$-dynamic behavior. As is known, the Kalman filter algorithm comprises in general one prediction step and one correction step in each calculation cycle. In the cycle k, an estimation $\hat{x}_k^-$ of a state from the state estimation $\hat{x}_{k-1}$ established in the preceding cycle k−1 as well as from the value of a control input $u_k$ at time k is calculated within the prediction step:

$$\hat{x}_k^- = A\hat{x}_{k-1} + Bu_k \quad (3)$$

A herein designates the system matrix representing the dynamic behavior of the system. Within the context of the invention, a single-track model of the vehicle with a $PDT_2$ dynamic behavior or a model with a $PT_2$ behavior is assumed. The dynamic behavior fixes the structure of the matrix A. The concrete values of parameters contained in the matrix must be adapted to the respective vehicle what can be performed in driving tests, for example. The corrected signal $Y_{corr}$ corresponds to the system state to be estimated within the context of the invention. Due to the dynamic behavior, the state equation is a difference equation of second order for the one-dimensional state variable, which is transferred into an equation system of first order according to a method which is principally known to the expert skilled in the art. The state vector in addition to the signal value $Y_{corr}(k)$ at time k also comprises the signal value at time k−1. The state vectors in equation (3) are therefore two-dimensional; matrix A is a 2×2-matrix. The measured signal Y is used as control input $u_k$. Apart from the estimation of the system state, a prediction $P_k^-$ for the incorrect rating is determined in the prediction step from the incorrect rating $P_{k-1}$ of the preceding cycle based on the equation $$P_k^- = AP_{k-1}A^T + Q \qquad (4)$$

in which case the matrix Q describes the system noise and is selected in a suitable manner.

In the correction step of the Kalman filter algorithm, initially the so-called Kalman amplification $K_k$ is calculated by way of $$K_k = P_k^- H^T (HP_k^- H^T + R)^{-1} \qquad (5)$$

in which case the matrix H indicates the relation between the measured variables and the considered state variables, and matrix R indicates the measurement noise. The average values of the extrema of the signal Y being determined in the fashion described hereinabove are employed herein as measured variables so that the matrix H corresponds to the unit element. Matrix R is selected in a suitable fashion.

Furthermore, the current estimate rate $\hat{x}_k$ of the state is calculated in the correction step by way of the equation $$\hat{x}_k = \hat{x}_k^- + K_k(y_k - H\hat{x}_k^-) \qquad (6)$$

in which case the measured variable $y_k$ corresponds to the average value determined in the cycle k. In addition, the error covariance matrix $P_k$ which is to be used in the prediction step of the following cycle is calculated in the correction step by $$P_k = (1 - K_k H) P_k^- \qquad (7)$$

Thus, the illustrated Kalman filter can be used to determine by approximation a base signal $Y_{corr}$ which is rid of the signal oscillations of the input signal Y. Compared to an extrapolation, the Kalman filter is advantageous because, based on a corresponding selection of the measurement noise (matrix R) and the system noise (matrix Q), it can be adjusted in an especially flexible fashion to which extent the signal $Y_{corr}$ shall be adapted to the measured signal Y. In addition, a weighting of the average values as a function of time can be provided in the Kalman filter in the form of a forgetting factor. As has been mentioned before, the Kalman filter is especially appropriate to determine the reference yaw rate signal $Y_{corr} = \dot{\psi}_{ref,corr}$ directly from the actual yaw rate signal $Y = \dot{\psi}_{meas}$.

The invention provides a control system which can be used to stabilize a car-trailer combination in the event of swaying motions of the trailer or semi-trailer by interventions into the steering system or by wheel-individual braking interventions. Since the oscillations of the car-trailer combination are encountered above a defined limit speed, it is provided anyway in an embodiment that the speed of the car-trailer combination is decreased by braking interventions below the limit speed when oscillations of the car-trailer combination appear in order to achieve lasting stabilization. Braking interventions of this type can be performed especially when yaw oscillations of the car-trailer combination are detected in spite of stabilizing interventions into the steering system.

The invention claimed is:

1. A method for stabilizing a car-trailer combination consisting of a towing vehicle and a trailer or semi-trailer comprising the following steps:
   detecting an input signal ($Y; \delta_H; \dot{\psi}_{meas}$) with signal oscillations due to a swaying motion of the trailer or semi-trailer, the input signal ($Y; \delta_H; \dot{\psi}_{meas}$) having a base component ($Y_{Basis}; \dot{\psi}_{Basis}$) superimposed by the signal oscillations,
   determining a reference signal ($\dot{\psi}_{ref,corr}$) correlating with an intermediate signal determined from the base component ($Y_{Basis}; \dot{\psi}_{Basis}$) of the input signal ($Y; \delta_H; \dot{\psi}_{meas}$),
   determining a correcting variable ($\Delta\delta; \Delta M$) depending on a deviation ($\Delta\dot{\psi}_{Trailer}$) between the reference signal ($\dot{\psi}_{ref,corr}$) and a detected signal ($\dot{\psi}_{meas}$), and
   influencing a driving condition of the towing vehicle according to the determined correcting variable ($\Delta\delta; \Delta M$).

2. The method as claimed in claim 1,
   wherein the reference signal is a reference yaw rate signal ($\dot{\psi}_{ref,corr}$) and the detected signal is an actual yaw rate signal ($\dot{\psi}_{meas}$).

3. The method as claimed in claim 1,
   wherein the reference signal ($\dot{\psi}_{ref,corr}$) is calculated based on a vehicle model and depends on the intermediate signal ($\delta_{H,corr}$).

4. The method as claimed in claim 1,
   wherein the input signal is a steering angle signal ($\delta_H$).

5. The method as claimed in claim 1,
   wherein the input signal and the actual signal ($\dot{\psi}_{meas}$) are identical and the intermediate signal corresponds to the reference signal ($\dot{\psi}_{ref,corr}$).

6. The method as claimed in claim 1, comprising the intermediate step of calculating an intermediate signal ($\delta_{H,corr}; \dot{\psi}_{ref,corr}$) from the input signal ($Y; \delta_H; \dot{\psi}_{meas}$) in a correction step, the intermediate signal approximately corresponding to the base component ($Y_{Basis}; \dot{\psi}_{Basis}$) of the input signal ($Y; \delta_H; \dot{\psi}_{meas}$).

7. The method as claimed in claim 6,
   wherein the correction step calculates average values of successive extreme values ($Y_{i-1}; Y_i; Y_{i+1}$) of the input signal ($Y; \delta_H; \dot{\psi}_{meas}$) and determines the intermediate signal ($\delta_{H,corr}; \dot{\psi}_{ref,corr}$) according to the average values.

8. The method as claimed in claim 7,
   wherein the intermediate signal ($\delta_{H,corr}; \dot{\psi}_{ref,corr}$) is determined by way of an extrapolation process from previously calculated average values.

9. The method as claimed in claim 8,
   wherein the average values in the extrapolation process are furnished with a weighting factor which is lower for older average values than for more recently calculated average values.

10. The method as claimed in claim 7,
    wherein the intermediate signal ($\delta_{H,corr}; \dot{\psi}_{ref,corr}$) is determined from the average values using a model-based filter.

11. The method as claimed in claim 10,
    wherein the input signal is an actuating variable and the intermediate signal is a state variable within the model on which the filter is based.

12. The method as claimed in claim 10,
    wherein the filter is a Kalman filter.

13. The method as claimed in claim 1,
    wherein the correcting variable is a steering torque ($\Delta M$) which is applied to a steering handle.

14. The method as claimed in claim 1,
wherein the correcting variable is an additional steering angle which allows controlling a steering system.

15. A driving dynamics control system for stabilizing a car-trailer combination consisting of a towing vehicle and a trailer or a semi-trailer, comprising:

a sensor detecting an input signal $(Y;\delta_H;\dot{\psi}_{meas})$ with signal oscillations due to a swaying motion of the trailer or semi-trailer, the input signal $(Y;\delta_H;\dot{\psi}_{meas})$ having a base component $(Y_{Basis};\dot{\psi}_{Basis})$ superimposed by the signal oscillations, a calculating device (104; 501) determining a reference signal $(\dot{\psi}_{ref,corr})$ correlating with an intermediate signal determined from the base component $(Y_{Basis};\dot{\psi}_{Basis})$ of the input signal $(Y;\delta_H;\dot{\psi}_{meas})$, a controlling device (102) determining a correcting variable $(\Delta\delta;\Delta M)$ depending on a deviation $(\Delta\dot{\psi}_{Trailer})$ between the reference signal $(\dot{\psi}_{ref,corr})$ and a detected signal $(\dot{\psi}_{meas})$, and an actuator influencing the driving condition of the towing vehicle according to the determined correcting variable $(\Delta\delta;\Delta M)$.

* * * * *

UNITED STATES PATENT AND TRADEMARK OFFICE
CERTIFICATE OF CORRECTION

Page 1 of 1

PATENT NO. : 8,046,147 B2
APPLICATION NO. : 12/094435
DATED : October 25, 2011
INVENTOR(S) : Waldbauer et al.

It is certified that error appears in the above-identified patent and that said Letters Patent is hereby corrected as shown below:

In the Claims

In col. 10, line 5, claim 1, insert a space after signal.

In col. 11, line 8, claim 15, in the equation after H, delete "," and insert --;--.

Signed and Sealed this
Twentieth Day of December, 2011

David J. Kappos
*Director of the United States Patent and Trademark Office*